July 2, 1940.  J. A. TALALAY  2,206,757
MANUFACTURE OF SPONGY AND CELLULAR PRODUCTS
FROM RUBBER AND RUBBER LIKE MATERIAL
Filed May 4, 1937    2 Sheets-Sheet 1
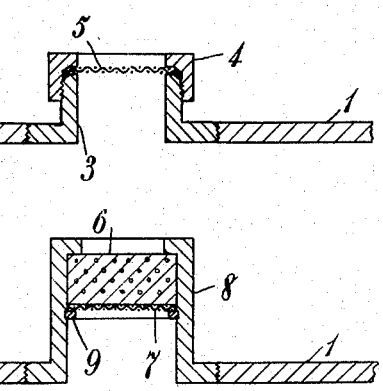
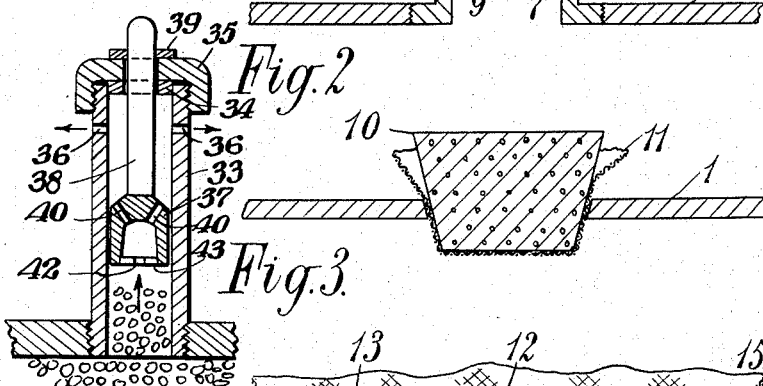
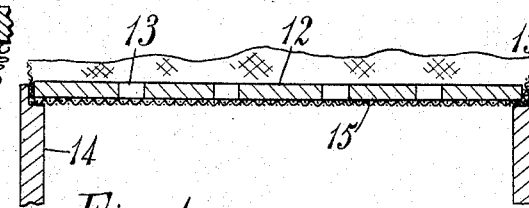
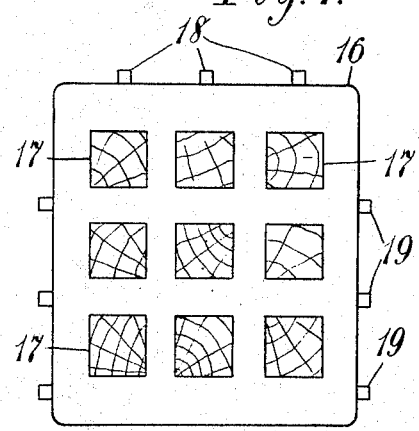
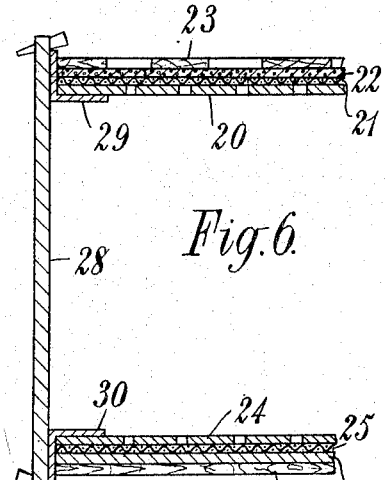
J. A. Talalay
INVENTOR
By: Glascock Downing & Seebold
ATTYS July 2, 1940.  J. A. TALALAY  2,206,757
MANUFACTURE OF SPONGY AND CELLULAR PRODUCTS
FROM RUBBER AND RUBBER LIKE MATERIAL
Filed May 4, 1937  2 Sheets-Sheet 2
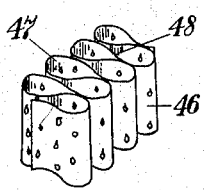
Fig. 9.
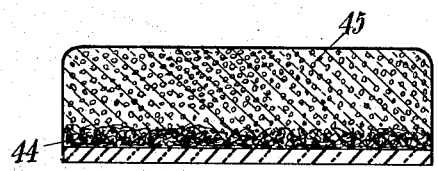
Fig. 8.
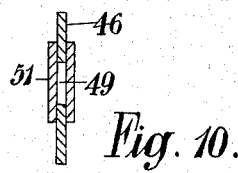
Fig. 10.
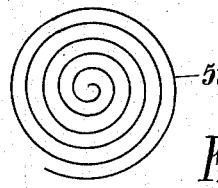
Fig. 13.
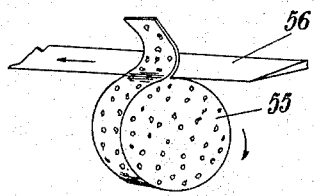
Fig. 12.
Fig. 14.
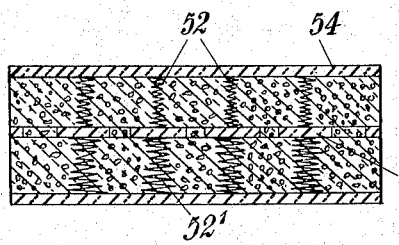
Fig. 11.
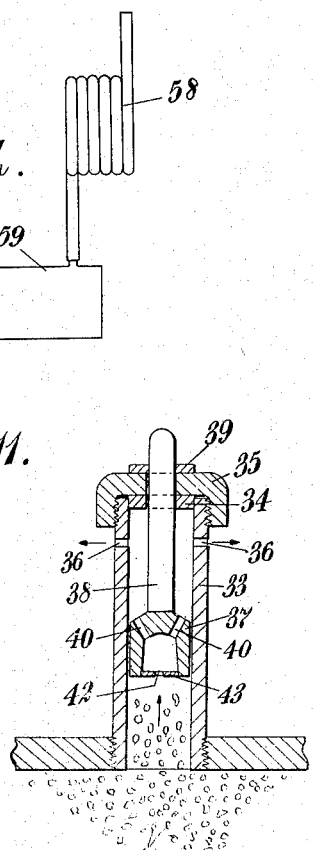
Fig. 7.
J. A. Talalay
INVENTOR
By Glascock Downing & Seebold
Attys.

Patented July 2, 1940

2,206,757

UNITED STATES PATENT OFFICE 2,206,757

MANUFACTURE OF SPONGY AND CELLULAR PRODUCTS FROM RUBBER AND RUBBER-LIKE MATERIALS

Josef Anton Talalay, Bedford, England

Application May 4, 1937, Serial No. 140,737
In Great Britain November 7, 1936

4 Claims. (Cl. 18—53)

This invention relates to procedure and apparatus for manufacturing articles comprising rubber or rubber-like material in cellular or sponged form.

In the sponging of a dispersion or solution of such material in a mold and setting it therein, as by coagulation or vulcanization or both, in apparatus such as heretofore has been employed, entrapped air or gas between the sponging material and a wall of the vessel or mold may prevent the sponging material from completely filling out and thus result in cavities or blemishes in the surface of the product, and also shrinkage may occur such as to result in an imperfectly molded article.

Also, when the material is sponged in a plurality of vessels or molds in a single chamber at the same time, by the use of pressure reduction as in my copending application Serial No. 67,990, filed March 9, 1936, or by any other procedure for the expansion or generation of gas in the material, problems have arisen in the fact that some of the vessels or molds may become filled with the sponged material and overflow before others have become completely filled.

The chief objects of this invention are to provide procedure and apparatus adapted to correct the above mentioned evils individually; to provide also for their concurrent correction by a single expedient; and to provide also, by the same expedient, a desirable surface texture for the product.

I attain these objects by providing for automatic closure of the vessel or mold against substantial further escape of sponged material at such time as the vessel or mold has become filled with the sponged material, the vessel or mold having, until then, a vent for escape of air or gas driven out by the expansion of the material and the closure retaining, if desired, its gas-permeable nature thereafter. The closure may be effected by means of a float-controlled valve, or, if it is desired to permit egress and ingress of gases throughout the operation, for reasons that will appear hereinafter, the closure preferably is effected by venting the air or gas through a porous material such as canvas, or similar fabric, for example, which may be stripped from the article after it is formed, or through a sheet of material having a multiplicity of small pores or perforations.

Of the accompanying drawings:

Fig. 1 is a fragmentary vertical section of a container or mold embodying and adapted for the practice of the invention.

Fig. 2 is a similar view of a modification.

Fig. 3 is a similar view of another modification.

Fig. 4 is a similar view of still another modification.

Fig. 5 is a vertical section of a mold adapted for the production of a cellular article having cavities of predetermined shape molded in it.

Fig. 6 is a fragmentary vertical section of a frothing vessel embodying and adapted for the practice of the invention.

Fig. 7 is a vertical section of apparatus comprising a float-and-valve device which embodies and is adapted for the practice of the invention.

In Fig. 1, the cover 1 of the vessel has a screw-threaded aperture in which is mounted a complementally threaded neck member 3 which has screwed thereon an annular clamping member 4 which clamps against the upper edge face of the neck member 3 a piece of canvas or the like 5, this arrangement being such that air or gas can escape through the canvas 5 as the frothing material rises in the vessel but when the rising froth reaches the canvas its contact therewith will cause it to lose moisture and perhaps locally coagulate, in that case forming a skin of dense material against the under side of the canvas, which skin, however, may have sufficient porosity to allow further escape of gas and prevent pocketing of gas within the mold. At all events the porous material prevents escape of froth from the vessel, thus acting virtually as a valve. Also, the permeable material permits air to enter the cells or interstices in the froth and thus stabilize it against shrinkage upon its removal from the mold or vessel before or after the setting or the vulcanizing operation.

To enhance coagulation the canvas may be treated with a coagulent, such as ammonium chloride or a coagulating acid, in the case of an aqueous dispersion of rubber, for example, as the frothing material.

Thiokol and Duprene are examples of rubber-like materials to which also the invention is applicable.

Examples of other porous materials that may be employed in place of the canvas are plaster of Paris, earthenware, unglazed porcelain, wood, cork, paper, cardboard and felt. A fabric like canvas or a cheap cotton fabric, however, is generally preferable, because of its cheapness, desirable degree of porosity, suitability for being treated with a coagulant, and flexibility adapting it to be stripped from the product.

The frothed material, filling the vessel or mold, can be fully coagulated and vulcanized therein or, if it has been frothed by means of a gas producing substance so that the gas pressure within the cells is substantially that of the atmosphere the froth can be poured into other vessels or molds for the setting and the vulcanizing operation. The invention also is applicable to prevulcanized dispersions, such as vulcanized rubber latex.

Fillers, coloring matter and fibrous material may be provided in the product either by mixing them therein before the beginning of the frothing operation or, in the case of fibrous material, such as hair, by disposing it as desired in the mold and allowing the frothing material to progress through its interstices, suitable means being provided, if desired, for maintaining a predetermined location or distribution of the fibrous material in the mold.

In Fig. 2 the valve means comprises a neck member 8 having at its upper end an internal flange against which is mounted a plug 6 of porous material such as sponge rubber or cork and a layer of canvas 7 may be held against the lower face of the plug by a snap ring 9.

In Fig. 3 the cover 1 of the vessel is formed with a simple opening in which is wedged a stopper-like member 10 of porous material, such as sponge rubber or cork, faced with a sheet 11 of canvas or the like.

In Fig. 4 a lid 12 formed with apertures 13 and faced with a sheet 15 of canvas or the like is fitted into the top of the vessel 14, against a suitably formed stop-shoulder.

In Fig. 5 cavity-molding blocks 17, 17 are supported from one or both of two opposite walls of a frothing vessel or mold 16 and the latter is provided not only with gas-venting and froth-stopping valve means 18 in its top wall but also with similar means 19, 19 mounted in its side walls, in such positions as to promote expansion of the froth in such several directions as to completely fill the mold notwithstanding the obstructing effect of the blocks 17, and with desirable uniformity of pore size and of density throughout, and, by avoiding the pocketing of air or gas between the expanding froth and the walls of the vessel, to avoid undesired cavities or blemishes in the surface of the product.

In Fig. 6 valve means are provided as to both the floor and the cover of the vessel 28, the composite cover being fitted into the vessel against an internal angle-iron stop 29 and the composite floor being similarly fitted into the vessel against an internal angle-iron stop 30.

The composite floor comprises, from the interior outward, a perforate sheet of metal 24, a sheet of canvas 25, an imperforate sheet of metal 26, and an imperforate sheet of wood 27.

The composite cover comprises, from the interior outward, a perforate sheet of metal 20, a sheet of canvas 21, a layer of sponge rubber 22 and an apertured sheet of wood 23.

In this embodiment the surface of the product, except at the positions of the relatively small apertures, is molded against metal surfaces, substantially without the formation of a skin of dense material on the product, whereas, when the molding is against porous material such as canvas, for example, such a skin is formed and the stripping of the porous material from it leaves upon it a fabric impression or, in the case of other porous materials such as earthenware, a mat surface.

Also, in the use of this embodiment of the invention the contraction of the froth in the vessel which normally takes place during the setting does not occur from the top, for the porous layer in conjunction with the perforated metal holds the froth up in the vessel. The same holds for the bottom of the vessel, when the latter has been provided with a bottom element similar in construction to the lid. The same will also hold for any side of the vessel which comprises a porous layer, and the shrinkage of the product during setting can be considerably reduced by making a sufficient area of the interior surface of the vessel of a porous nature.

In Fig. 7, a different type of valve means, comprising rigid slide-valve members, is shown.

The container is provided with a neck member 33 closed at the top by a washer 34 and screw-cap 35 which are centrally apertured to accommodate with a sliding fit a guide-stem 38 of a preferably hollow float member 37. Above the cap 35 the stem 38 is provided with a stop collar 39 for supporting the float in its lowermost position in the neck member 33.

In order that air or gas may readily escape until the vessel and a part of the neck member have become filled with the sponged material the float member 37 is provided with apertures 40, 40 and the neck member near its top is provided with apertures 36, 36. To cause the float member to have greater buoyancy on the sponging material when the latter reaches it the cavity of the float member may be partially closed at its lower end by a pressed-in sheet of porous material 43, with or without one or more apertures such as the aperture 42.

This construction is such that the sponging material rising in the neck member 33 will engage the float and raise it until its side-wall closes off the apertures 36 of the neck member, upon the slide-valve principle, and, if desired, the position of the projecting portion of the guide stem 38 can be employed, visually or otherwise, to indicate or register the fact that the vessel has become filled with the cellular material.

The closure effected by the method and apparatus of the invention need not be hermetic and can remain permeable to gases while impermeable to the froth during the period following the complete filling of the vessel and during the setting operation. This is very important in those cases where, partly through collapse of a certain amount of bubbles, partly through the continuation of the chemical reaction or of the physical change, even after the mold has been filled completely, more gas is liberated which, if not permitted to escape, would accumulate over the froth (which is still mobile) and would tend to compress the volume of the latter. Again, the possible non-hermetic nature of the closure has the advantage, when making spongy or cellular rubber products by a method employing reduction of pressure to subatmospheric, that after the setting is complete and normal pressure is restored air or other gas can penetrate through the permeable closure, slowly filling the structure with air or gas.

In the appended claims the expression "a material having the pertinent characteristics of rubber" is to be understood as meaning a material having all of the following characteristics: that it can be in the form of an aqueous dispersion; that the dispersion can be caused to foam by modification of its condition of pressure in relation to temperature; that the foam produced can be irreversibly set in its expanded form; and that when set it will have an elasticity and resilience similar to that of vulcanized natural rubber.

I claim:

1. The method of making an article of cellular material which comprises causing an aqueous dispersion of a material having the pertinent characteristics of rubber to extend itself by expansion in cellular form in a vessel and freely venting gaseous fluid from the vessel while the said material attains a determinate volume therein and preventing escape of the dispersion by effecting local coagulation of the said material in the dispersion by contact of the dispersion with a gas-permeable member.

2. The method of making an article of cellular material which comprises causing an aqueous dispersion of a material having the pertinent characteristics of rubber to extend itself by expansion in cellular form in a vessel and freely venting gaseous fluid from the vessel while the said material attains a determinate volume therein and preventing escape of the dispersion by effecting local coagulation of the said material in the dispersion by contact of the dispersion with a gas-permeable member, the gas-permeable member being preliminarily treated with a substance adapted to effect coagulation of the dispersed material.

3. The method of making an article of cellular material which comprises causing an aqueous dispersion of a material having the pertinent characteristics of rubber to extend itself by expansion in cellular form in a vessel and freely venting gaseous fluid from the vessel through a porous material until the dispersion contacts the said porous material and thereby is locally coagulated and thus restricted against further expansion.

4. The method of making an article of cellular material which comprises causing a dispersion of an aqueous material having the pertinent characteristics of rubber to extend itself by expansion in cellular form in a vessel and freely venting gaseous fluid from the vessel through a gas permeable member, the venting being effected at a plurality of positions determinately located with reference to the shape of the space within the vessel and with reference to resistance to flow incident to the shape of said space, escape of the said material being prevented by local coagulation of the dispersion upon contact of the dispersion with the gas permeable member.

JOSEF ANTON TALALAY.